(12) United States Patent
Rice

(10) Patent No.: US 7,726,738 B1
(45) Date of Patent: Jun. 1, 2010

(54) CHILD CAR SEAT DEVICE

(76) Inventor: Ryon J. Rice, 21573 Appaloosa Ct., Canyon Lake, CA (US) 92587

( * ) Notice: Subject to any disclaimer, the term of this patent is extended or adjusted under 35 U.S.C. 154(b) by 165 days.

(21) Appl. No.: 11/779,659

(22) Filed: Jul. 18, 2007

(51) Int. Cl.
*A47D 1/10* (2006.01)
*A47C 7/62* (2006.01)

(52) U.S. Cl. .............................. 297/256.12; 297/250.1; 297/188.08; 297/188.11

(58) Field of Classification Search ............ 297/256.12, 297/188.08, 188.11, 250.1
See application file for complete search history.

(56) References Cited

U.S. PATENT DOCUMENTS

| | | | |
|---|---|---|---|
| 4,231,612 A | | 11/1980 | Meeker |
| D265,780 S | | 8/1982 | Johansson |
| 4,688,850 A | | 8/1987 | Brownlie et al. |
| 4,762,364 A | * | 8/1988 | Young .................... 297/256.12 |
| 4,826,246 A | | 5/1989 | Meeker |
| 4,936,629 A | * | 6/1990 | Young .................... 297/256.12 |
| 4,971,392 A | * | 11/1990 | Young .................... 297/256.12 |
| 5,183,312 A | * | 2/1993 | Nania .................... 297/256.12 |
| 5,358,307 A | * | 10/1994 | Shafer et al. ............. 297/188.2 |
| 5,524,964 A | * | 6/1996 | Weimersheimer ...... 297/256.12 |
| 5,662,378 A | * | 9/1997 | Carruth .................. 297/256.15 |
| 5,775,771 A | * | 7/1998 | La Cour et al. ......... 297/188.11 |
| 6,158,807 A | * | 12/2000 | Hampton .................. 297/256.1 |
| 6,692,073 B1 | * | 2/2004 | Weathersby ........... 297/256.16 |
| 6,910,696 B2 | | 6/2005 | Bargery et al. |
| 6,938,954 B1 | * | 9/2005 | Hendren et al. ......... 297/256.12 |
| 6,997,509 B2 | * | 2/2006 | Kain ....................... 297/250.1 |
| 7,029,069 B2 | * | 4/2006 | Hendren et al. ......... 297/256.12 |
| 7,163,265 B2 | * | 1/2007 | Adachi ................... 297/256.12 |
| 7,278,683 B2 | * | 10/2007 | Williams et al. .... 297/188.11 X |
| 7,357,451 B2 | * | 4/2008 | Bendure et al. ........ 297/256.12 |
| 2004/0070246 A1 | * | 4/2004 | Adachi ................... 297/256.12 |
| 2004/0232747 A1 | | 11/2004 | Yamazaki et al. |
| 2005/0225139 A1 | | 10/2005 | Biaud |

* cited by examiner

*Primary Examiner*—Rodney B White

(57) ABSTRACT

A child car seat device for facilitating insertion of a child into the infant car seat in a vehicle includes a base being positioned on a seat of the vehicle. The base includes a top wall, a bottom wall and a perimeter wall that extends between the top wall and the bottom wall to define an interior space of the base. Each of a pair of side walls of the perimeter wall has a seat belt aperture that extends therethrough to permit a seat belt to be extended through the base to secure the base to the seat. A seat assembly is rotatably coupled to the base. The seat assembly receives and supports the child. The seat assembly is rotatable through approximately 180 degrees to facilitate the child being inserted into and removed from the seat assembly.

8 Claims, 7 Drawing Sheets

CHILD CAR SEAT DEVICE

BACKGROUND OF THE INVENTION

1. Field of the Invention

The present invention relates to infant car seats and more particularly pertains to a new infant car seat for facilitating insertion of a child into the infant car seat in a vehicle.

2. Description of the Prior Art

The use of infant car seats is known in the prior art. While these devices fulfill their respective, particular objectives and requirements, the need remains for a device that has certain improved features that allows a portion of the device to pivot towards a door of a vehicle to facilitate insertion of a child into the device. Additionally, the device should include at least one drawer to allow articles to be stored in device during transport of the child.

SUMMARY OF THE INVENTION

The present invention meets the needs presented above by generally comprising a base being positioned on a seat of the vehicle. The base includes a top wall, a bottom wall and a perimeter wall that extends between the top wall and the bottom wall to define an interior space of the base. Each of a pair of side walls of the perimeter wall has a seat belt aperture that extends therethrough to permit a seat belt to be extended through the base to secure the base to the seat. A seat assembly is rotatably coupled to the base. The seat assembly receives and supports the child. The seat assembly is rotatable through approximately 180 degrees to facilitate the child being inserted into and removed from the seat assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
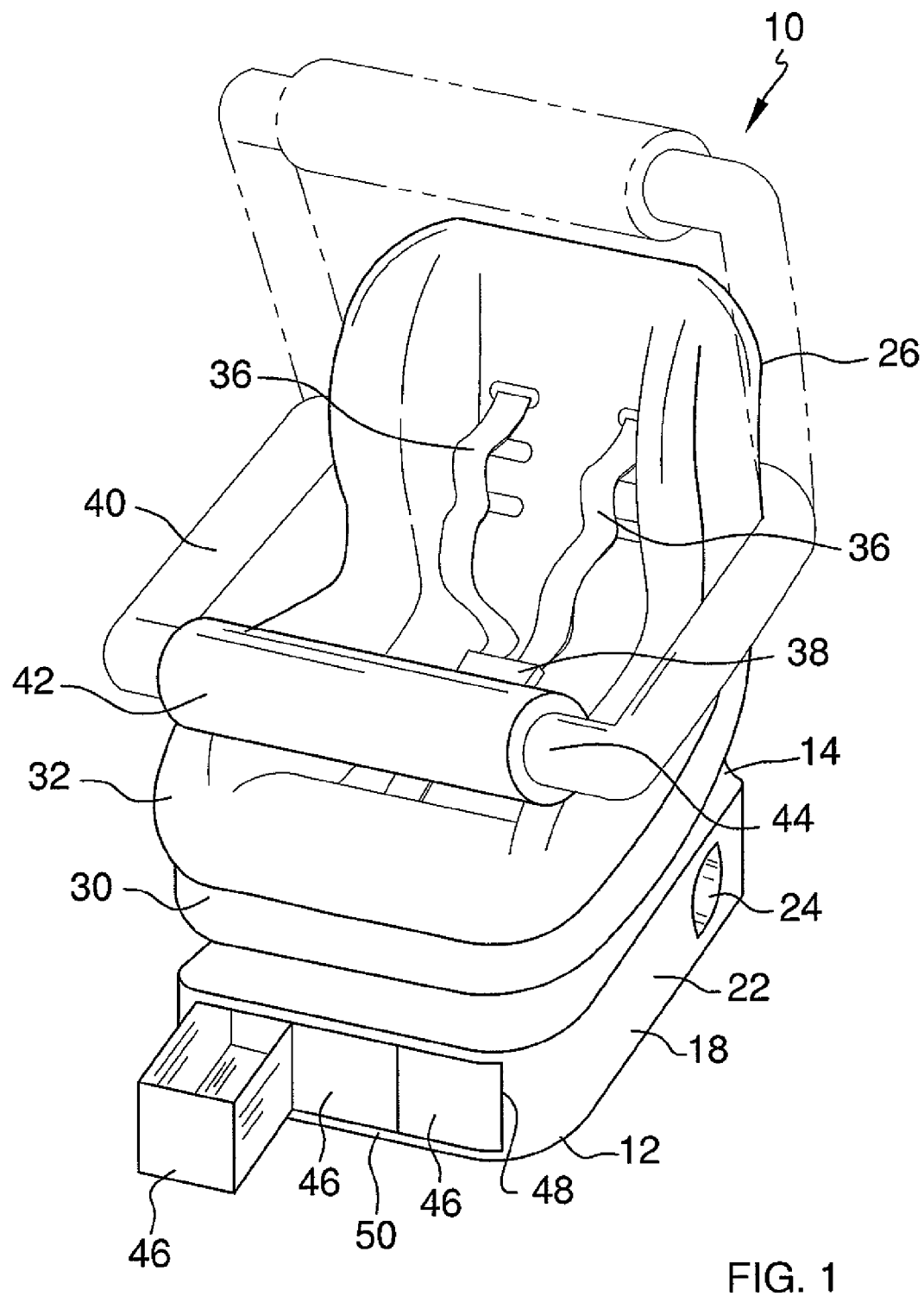
FIG. 1 is a perspective view of a child car seat device according to the present invention.
Figure 2:
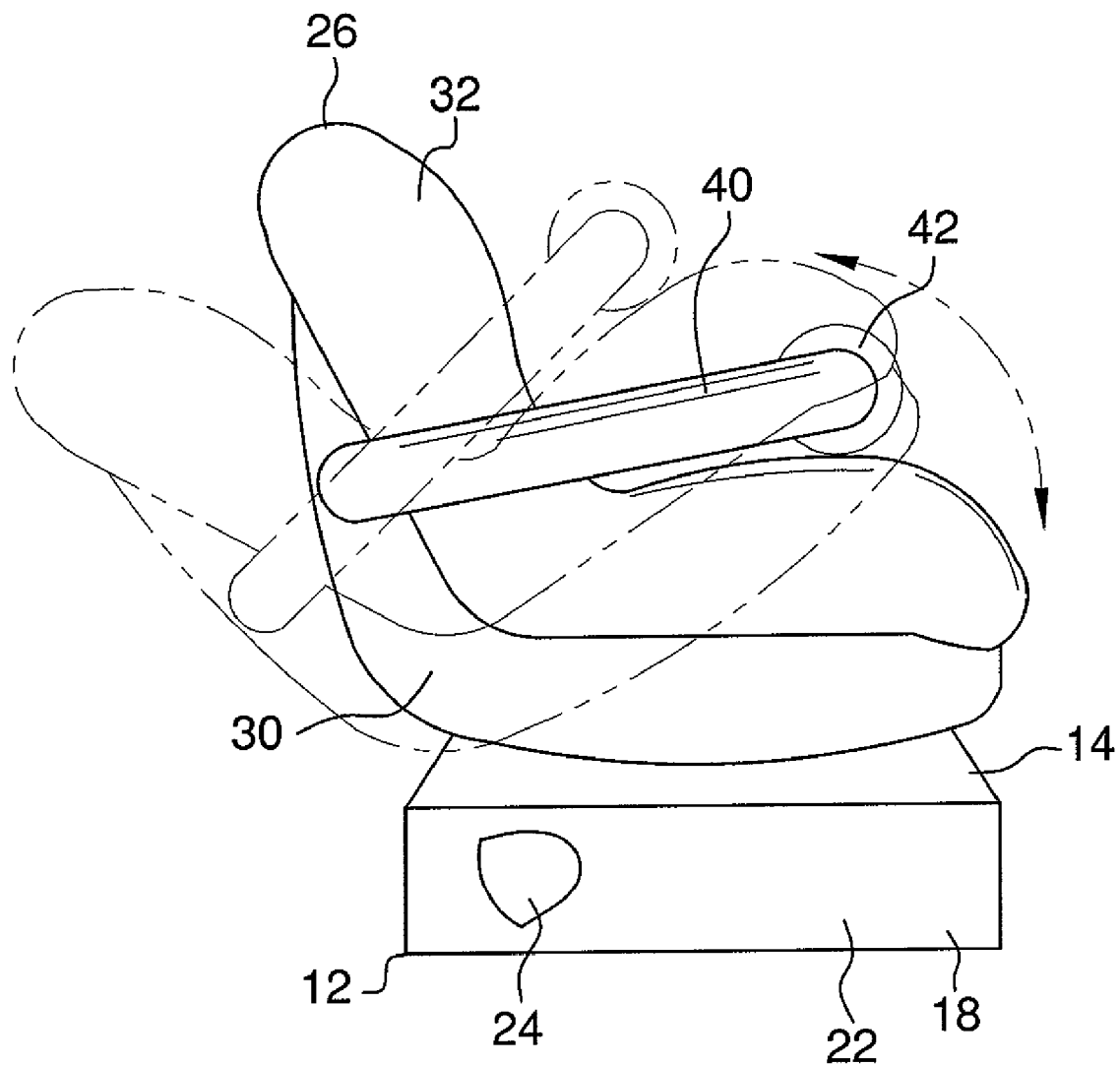
FIG. 2 is a side view of the present invention.
Figure 3:
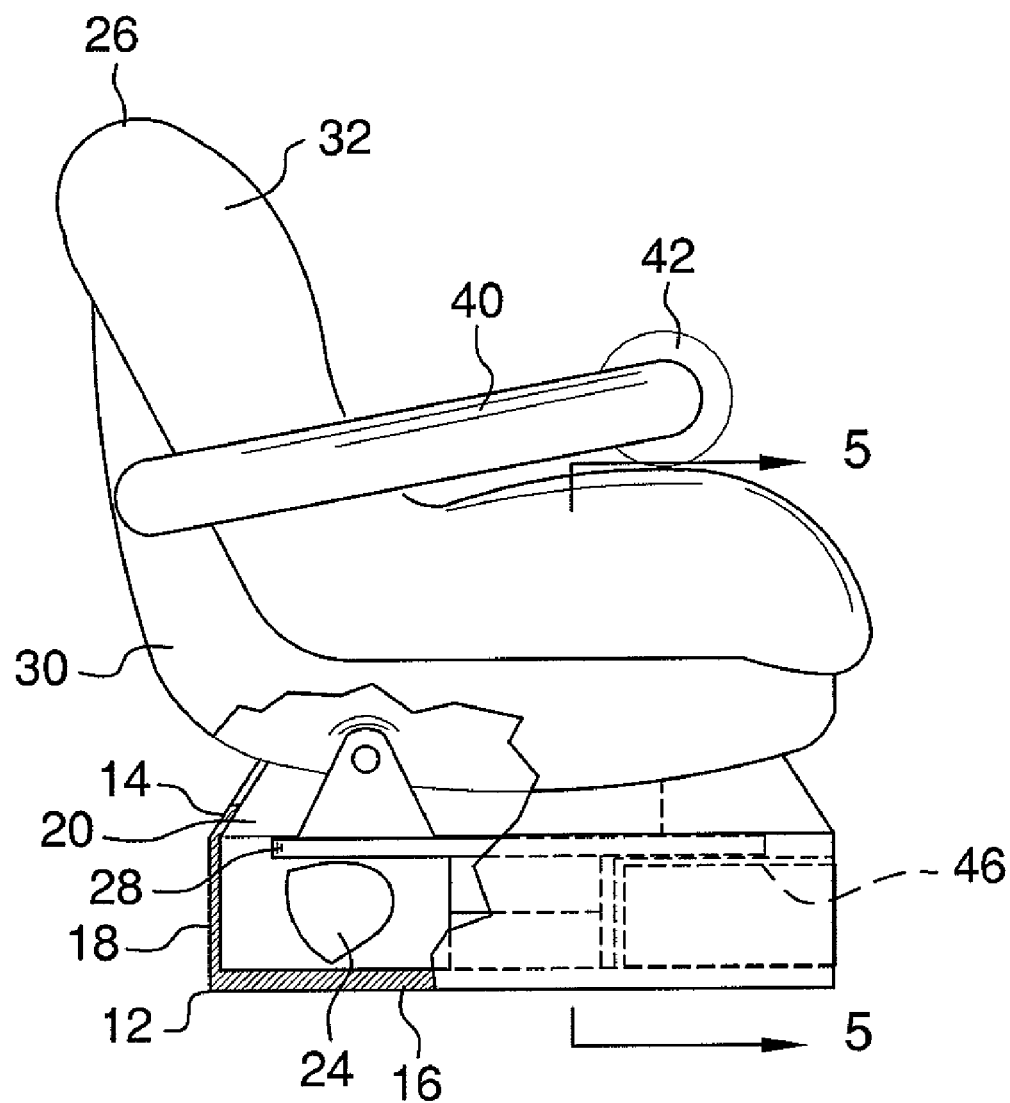
FIG. 3 is a partial cross-sectional view of the base of the present invention.
Figure 4:
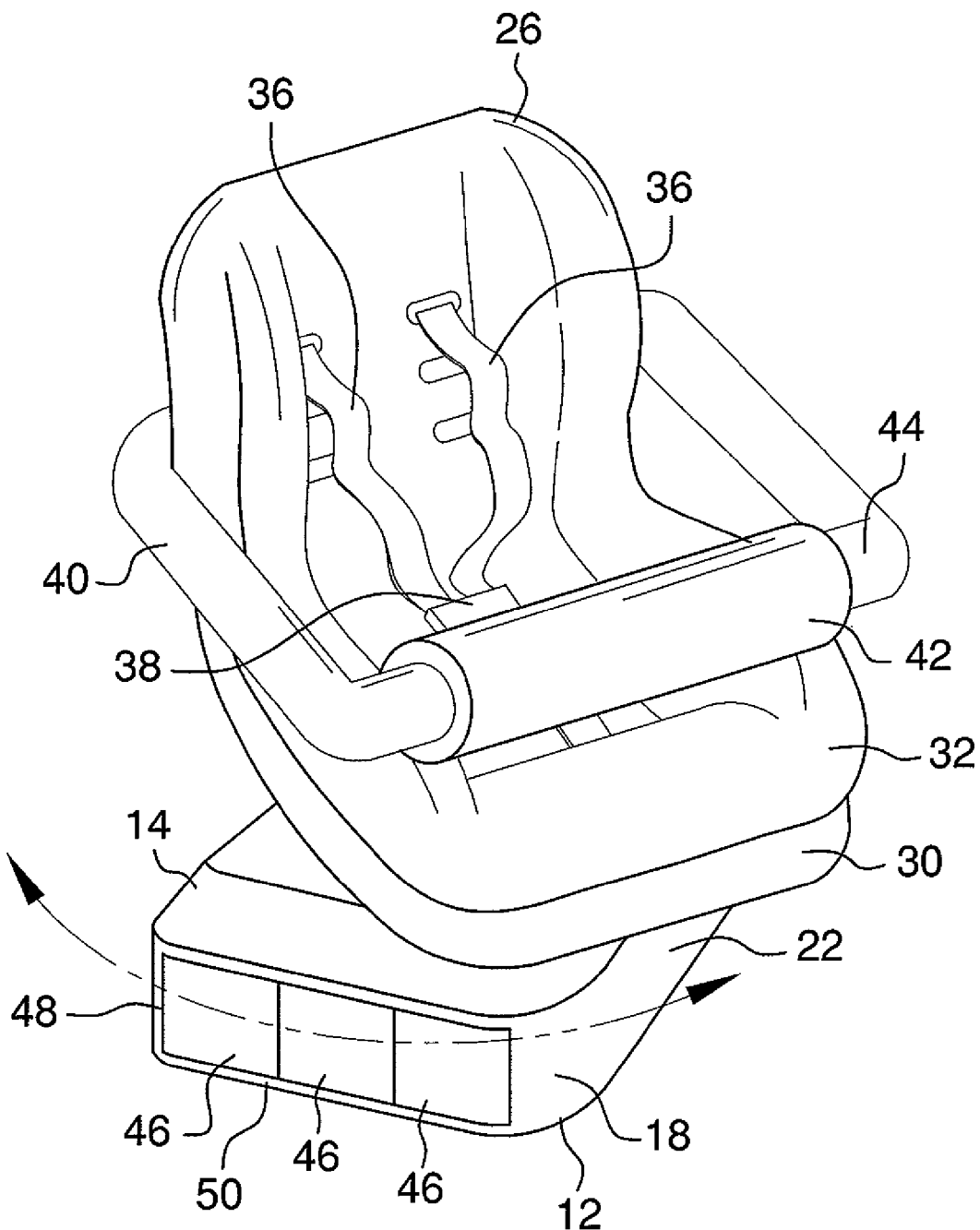
FIG. 4 is a front perspective view of the present invention showing the seat assembly being rotated with respect to the base.
Figure 5:
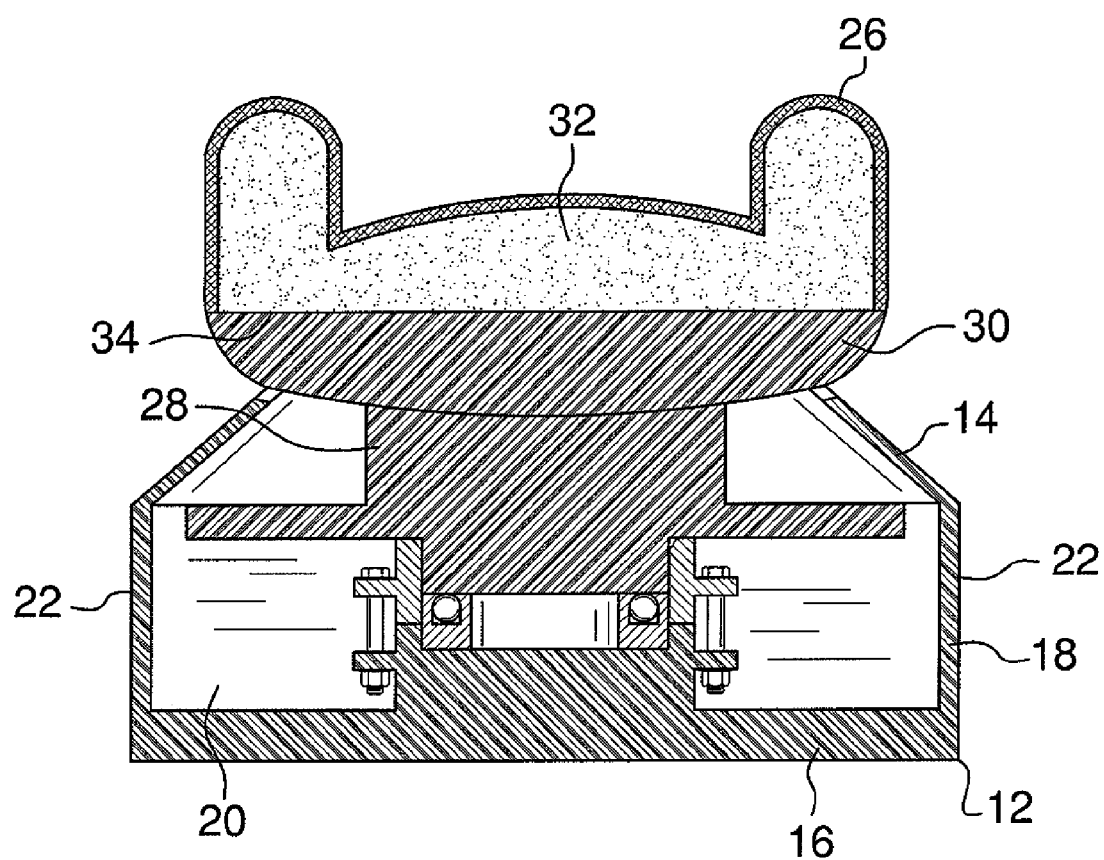
FIG. 5 is a cross-sectional view of the present invention taken along lint 5-5 of FIG. 3.
Figure 6:
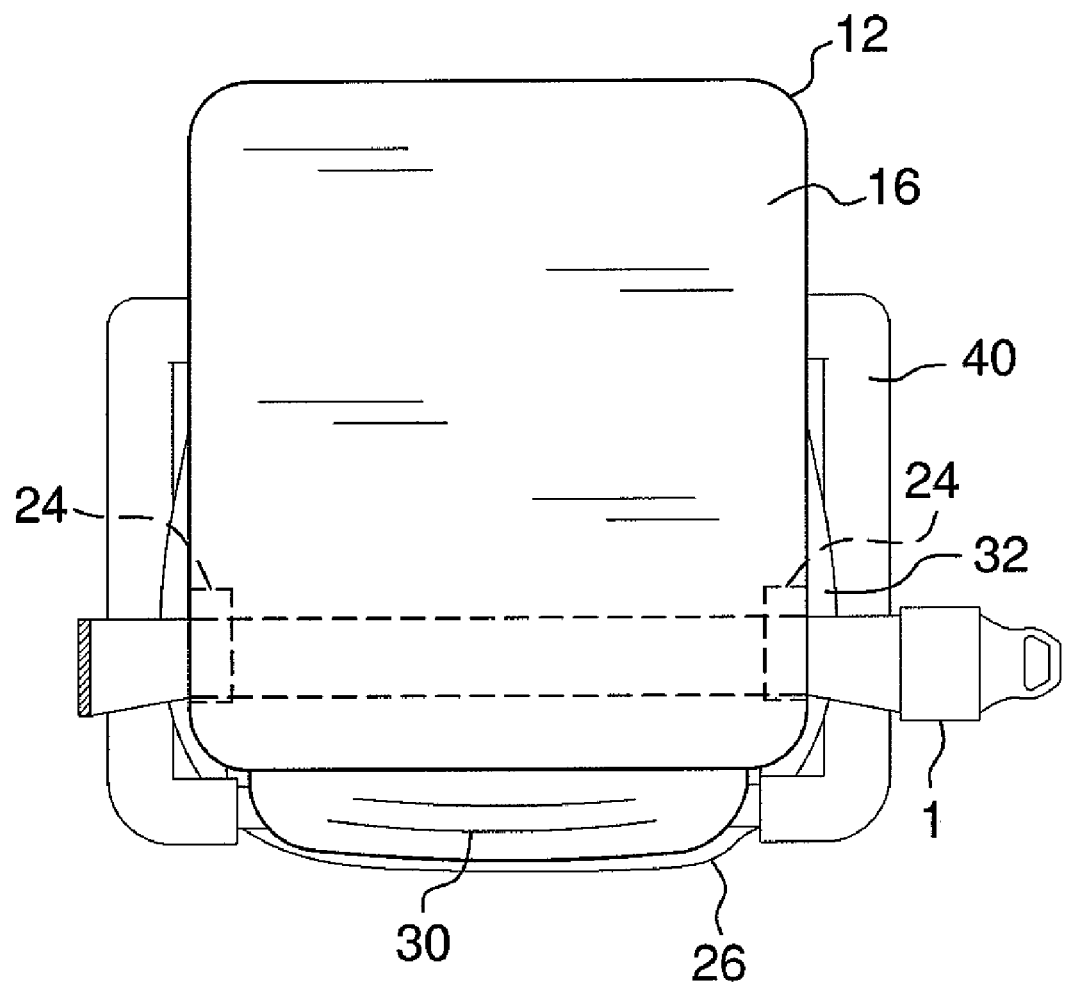
FIG. 6 is a rear view of the present invention.
Figure 7:
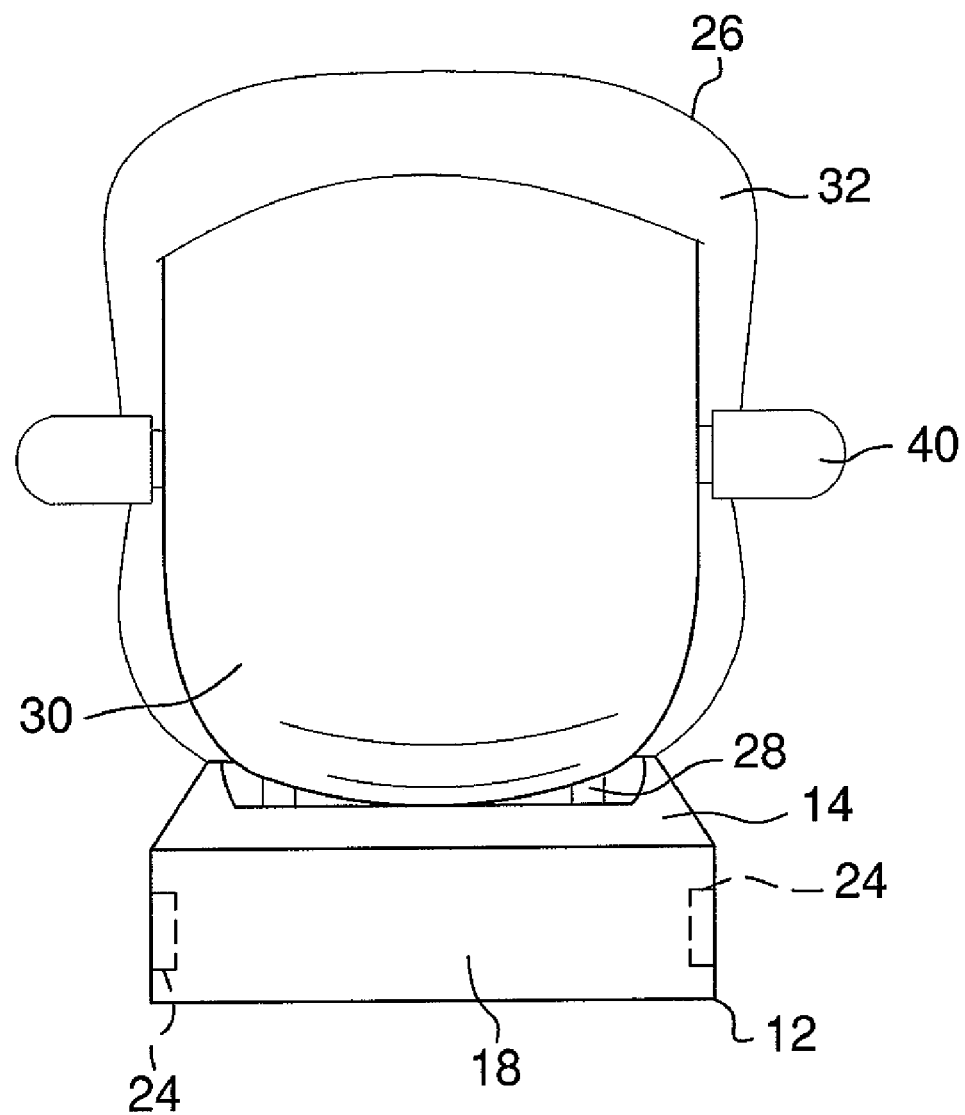
FIG. 7 is a bottom view of the present invention showing the seat belt extending through the base.

With reference now to the drawings, and in particular to FIGS. 1 through 7 thereof, a new infant car seat embodying the principles and concepts of the present invention and generally designated by the reference numeral 10 will be described.

As best illustrated in FIGS. 1 through 7, the child car seat device 10 generally comprises a base 12 being positioned on a seat of a vehicle. The base 12 includes a top wall 14, a bottom wall 16 and a perimeter wall 18 that extends between the top wall 14 and the bottom wall 16 to define an interior space 20 of the base 12. Each of a pair of side walls 22 of the perimeter wall 18 has a seat belt aperture 24 that extends therethrough to permit a seat belt 1 to be extended through the base 12 to secure the base 12 to the seat.

A seat assembly 26 is rotatably coupled to the base 12. The seat assembly 26 receives and supports a child. The seat assembly 26 is rotatable through approximately 180 degrees to facilitate the child being inserted into and removed from the seat assembly 26. The seat assembly 26 includes a pedestal 28 positioned in the interior space 20 of the base 12 and rotatably coupled to the bottom wall 16. The pedestal 28 extends upwardly through the top wall 14 of the seat assembly 26.

The seat assembly 26 additionally includes a seat section 30 pivotally coupled to the pedestal 28 and positioned above the top wall 14. The seat section 30 receives the child in a seated position when the child is placed in the seat assembly 26. The seat section 30 is pivoted between an upright position and a reclined position. A cushion cover 32 is coupled to an upper surface 34 of the seat section 30. The cushion cover 32 is compressible to cushion the child positioned on the seat section 30.

The seat assembly 26 also includes a plurality of restraint belts 36 coupled to the seat section 30 and that extends through the cushion cover 32. The restraint belts 36 are extended over a torso of the child positioned on the cushion cover 32. A restraint buckle 38 is coupled to the seat section 30 and extends through the cushion cover 32. The restraint buckle 38 is buckled to the restraint belts 36 to secure the restraint belts 36 over the torso of the child and secure the child to the seat section 30.

Additionally, the seat assembly 26 includes a guard bar 40 hingedly coupled to the seat section 30. The guard bar 40 is pivoted between a lowered position and a raised position. The guard bar 40 in the lowered position is extended across the seat section 30 and positioned in front of the child. The guard bar 40 in the raised position extends upwardly from the seat section 30 to permit the child to be placed in and removed from the seat section 30. The guard bar 40 is approximately U-shaped. An impact cushion 42 is mounted to a medial section 44 of the guard bar 40. The impact cushion 42 is positioned in front of the child positioned on the seat section 30 when the guard bar 40 is in the lowered position. The impact cushion 42 cushions the child should the child impact the guard bar 40.

At least one drawer 46 is coupled to the base 12 and is extendable through an access aperture 48 that extends through a front wall 50 of the perimeter wall 18 of the base 12. The at least one drawer 46 is extendable from the interior space 20 to receive articles. The at least one drawer 46 is slid into the interior space 20 to store the articles in the interior space 20.

In use, the base 12 is positioned on the seat of the vehicle and the seat belt 1 is passed through the seat belt apertures 24 and buckled to secure the base 12 to the seat. The seat assembly 26 is rotated with respect to the base 12 towards a door of the vehicle to allow the child to be placed in the seat assembly 26 with the guard bar 40 in the raised position. The restraint belts 36 are extended over the torso of the child and secured to the restraint buckle 38 to secure the child to the seat assembly 26. The guard bar 40 is the pivoted to the lowered position and the seat assembly 26 is pivoted with respect to the base 12 so that the child faces the front of the vehicle. Articles can be placed in the at least one drawer 46 to be stored in the base 12 during transport of the child.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child car seat device for securing a child in a vehicle, said device comprising:
   a base being positioned on a seat of the vehicle, said base including a top wall, a bottom wall and a perimeter wall extending between said top wall and said bottom wall to define an interior space of said base, each of a pair of side walls of said perimeter wall having a seat belt aperture extending therethrough to permit a seat belt to be extended through said base to secure said base to the seat;
   a seat assembly being rotatably coupled to said base, said seat assembly receiving and supporting the child, said seat assembly being rotatable through approximately 180 degrees to facilitate the child being inserted into and removed from said seat assembly, said seat assembly including;
      a pedestal being positioned in said interior space of said base and rotatably coupled to said bottom wall, said pedestal extending upwardly through said top wall of said base;
      a seat section being pivotally coupled to said pedestal and positioned above said top wall, said seat section receiving the child in a seated position when the child is placed in the seat assembly, said seat section being pivotable between an upright position and a reclined position;
      said top wall being angled upwardly from said perimeter and toward a juncture of said pedestal and said seat section; and
   at least one drawer being coupled to said base and being extendable through an access aperture extending through a front wall of said perimeter wall of said base, said at least one drawer being extendable from said interior space to receive articles, said at least one drawer being slid into said interior space to store the articles in said interior space.

2. The device according to claim 1, wherein said seat assembly includes a cushion cover being coupled to an upper surface of said seat section, said cushion cover being compressible to cushion the child positioned on said seat section.

3. The device according to claim 2, wherein said seat assembly includes a plurality of restraint belts being coupled to said seat section and extending through said cushion cover, said restraint belts being extended over a torso of the child positioned on said cushion cover.

4. The device according to claim 1, wherein said seat assembly includes a restraint buckle being coupled to said seat section and extending through said cushion cover, said restraint buckle being buckled to said restraint belts to secure said restraint belts over the torso of the child and secure the child to said seat section.

5. The device according to claim 1, wherein said seat assembly includes a guard bar being hingedly coupled to said seat section, said guard bar being pivoted between a lowered position and a raised position, said guard bar in the lowered position being extended across said seat section and positioned in front of the child, said guard bar in the raised position extending upwardly from said seat section to permit the child to be placed in and removed from said seat section.

6. The device according to claim 5, wherein said seat assembly includes said guard bar being approximately U-shaped.

7. The device according to claim 5, wherein said seat assembly includes an impact cushion being mounted to a medial section of said guard bar, said impact cushion being positioned in front of the child positioned on said seat section when said guard bar is in the lowered position, said impact cushion cushioning the child should the child impact said guard bar.

8. A child car seat device for securing a child in a vehicle, said device comprising:
   a base being positioned on a seat of the vehicle, said base including a top wall, a bottom wall and a perimeter wall extending between said top wall and said bottom wall to define an interior space of said base, each of a pair of side walls of said perimeter wall having a seat belt aperture extending therethrough to permit a seat belt to be extended through said base to secure said base to the seat;
   a seat assembly being rotatably coupled to said base, said seat assembly receiving and supporting the child, said seat assembly being rotatable through approximately 180 degrees to facilitate the child being inserted into and removed from said seat assembly, said seat assembly comprising;
      a pedestal being positioned in said interior space of said base and rotatably coupled to said bottom wall, said pedestal extending upwardly through said top wall of said base;
      a seat section being pivotally coupled to said pedestal and positioned above said top wall, said seat section receiving the child in a seated position when the child is placed in the seat assembly, said seat section being pivoted between an upright position and a reclined position, said top wall being angled upwardly from said perimeter and toward a juncture of said pedestal and said seat section;
      a cushion cover being coupled to an upper surface of said seat section, said cushion cover being compressible to cushion the child positioned on said seat section;
      a plurality of restraint belts being coupled to said seat section and extending through said cushion cover, said restraint belts being extended over a torso of the child positioned on said cushion cover;
      a restraint buckle being coupled to said seat section and extending through said cushion cover, said restraint buckle being buckled to said restraint belts to secure said restraint belts over the torso of the child and secure the child to said seat section;

a guard bar being hingedly coupled to said seat section, said guard bar being pivoted between a lowered position and a raised position, said guard bar in the lowered position being extended across said seat section and positioned in front of the child, said guard bar in the raised position extending upwardly from said seat section to permit the child to be placed in and removed from said seat section, said guard bar being approximately U-shaped;

an impact cushion being mounted to a medial section of said guard bar, said impact cushion being positioned in front of the child positioned on said seat section when said guard bar is in the lowered position, said impact cushion cushioning the child should the child impact said guard bar; and at least one drawer being coupled to said base and being extendable through an access aperture extending through a front wall of said perimeter wall of said base, said at least one drawer being extendable from said interior space to receive articles, said at least one drawer being slid into said interior space to store the articles in said interior space.

* * * * *